United States Patent Office 3,189,524
Patented June 15, 1965

3,189,524
FUEL ELEMENT ASSEMBLY
Karl H. Höcker, Stuttgart-Vaihingen, and Friedrich Wagner, Stuttgart-Mohringen, Germany, assignors to Siemens-Schuckertwerke Aktiengesellschaft, Erlangen, Germany, a corporation of Germany
Filed July 9, 1959, Ser. No. 825,914
Claims priority, application Germany, July 12, 1958, S 58,958
2 Claims. (Cl. 176—71)

The present invention relates to a neutronic reactor and fuel element wherein the energy of nuclear fission is transferred primarily through thermal radiation to the working fluid or other work-medium.

In the practical use of heat energy it is, of course, well known that heat can be transferred from a hot body to a cooler body not only by thermal conduction and convection but also by thermal radiation. Usage of the latter phenomenon is found, for example, in boiler plants having an indirectly heated vaporizer and superheating system. In this connection, the heat generated in the boiler plant is transferred to the heating surfaces of a firebox primarily through radiation and secondarily in the flues by convection.

In known arrangements of neutronic reactors, virtually all of the thermal output is transferred from the fuel elements to the coolant fluid by means of conduction and convection. On the other hand, only a negligibly small portion of the reactor heat is transferred by thermal radiation due to the relatively low temperature of the fuel surface. A quantitative transfer of heat by thermal radiation becomes technically feasible only at temperatures in excess of 1000° C. Therefore, the fuel elements of a neutronic reactor employing thermal radiation would have to withstand a thermal load of at least 60 watts per cm.$^2$.

In a practical application, however, the operating temperature of the primary reactor cooling system can be in the order of 500° C. In order to afford a heat transfer mechanism existing primarily by thermal radiation, the fuel elements of the reactor should have a surface temperature of about 2000° C. during operation of the reactor. At this temperature, the thermal load of the fuel elements will be in the neighborhood of 100 watts per cm.$^2$. With the employment of a thermoradiational cooling arrangement, the fuel elements can be spaced from other components of the reactor, including the coolant medium, thereby preventing undesirable chemical or intermetallic reactions between the fissile material and the coolant and structural materials contained within the reactor. Moreover, the fuel elements need not be canned or clad in the ordinary sense, thereby eliminating the problems of differential expansion and the accumulation of fissional gases and other products within closely confined areas. Another advantage of thermoradiational cooling of the fuel elements resides in the fact that the temperature gradient across the fuel elements is much less, thereby eliminating thermal cracks and other thermally induced damage. With the spaced fuel element relationship permitted by radiational cooling, the fuel elements can be arranged so that they do not mechanically stress other components of the reactor core, and the spacing of the fuel in this manner eliminates many operating restrictions upon the resultant temperature of the cooling medium. By eliminating the need for closely sheathing or cladding the fissile material, the various solid-state reactions between the cladding and fuel materials are avoided.

In view of the foregoing, it is an object of the present invention to provide a novel and efficient neutronic reactor and fuel element therefor.

Another object of the invention is the provision of a neutronic reaction in which the fuel elements thereof are provided with novel means to enable their operation with a relatively high surface temperature.

A further object of the invention is the provision of a neutronic reactor fuel element employing novel means to permit maintenance of the fissile material contained therein at a relatively high operating temperature, but at a relatively low temperature gradient thereacross.

Another object of the invention is the provision of a neutronic reactor fuel assembly having novel means associated therewith for providing differential thermal expansion between the fissile and structural materials employed therein.

Another object of the invention is the provision of a novel neutronic reactor system which is adapted for cooling at least primarily by thermal radiation.

Still another object of the invention is the provision of a neutronic reactor system adapted for cooling by liquid metals or by gases and having novel means associated therewith for separating the fissile and coolant materials employed therein.

These and other objects, features, and advantages of the invention will be elaborated upon during the forthcoming description of illustrative modifications of the invention, with the description being taken in conjunction with the accompanying drawings, wherein.

The reactor is similar in construction to the known lattice type, that is, the cooling ducts extend through the moderator region in a lattice pattern; but the reactor according to the invention is different from conventional reactors with respect to the fuel used and the mounting thereof in the lattice, said difference residing in that the nuclear fuel utilized comprises high melting, thermostable, fissionable and, as the case may be, convertible compounds which, in the form of bodies, are arranged in the cooling ducts without engaging the heat-absorbing cooling surface. The annular spaces of the ducts are in series with the coolant or work-medium circuit.

Suitable as nuclear fuels according to the invention are materials of high thermal shock resistance, such as compositions of enriched uranium or plutonium carbide compounds with graphite, alloys of zirconium-uranium, cermets, and the like. If the fuel consists of a $UC_2$-graphite composition, it will remain in its solid state even at a temperature of 2450° C.; and, in particular, the desirable physical properties of the graphite are preserved. The same conditions exist if there are used thorium carbide and graphite.

The "form bodies" of the fuel elements can have the configuration of rods or plates without direct jacketing. They can be solid or hollow, and can be arranged in the fuel assemblies either individually or in bundles. The diameter of the rods or the thickness of the plates, respectively, is chosen so that the temperature stresses, as well as the maximum operating temperature, will be kept within tolerable limits.

Figure 1:
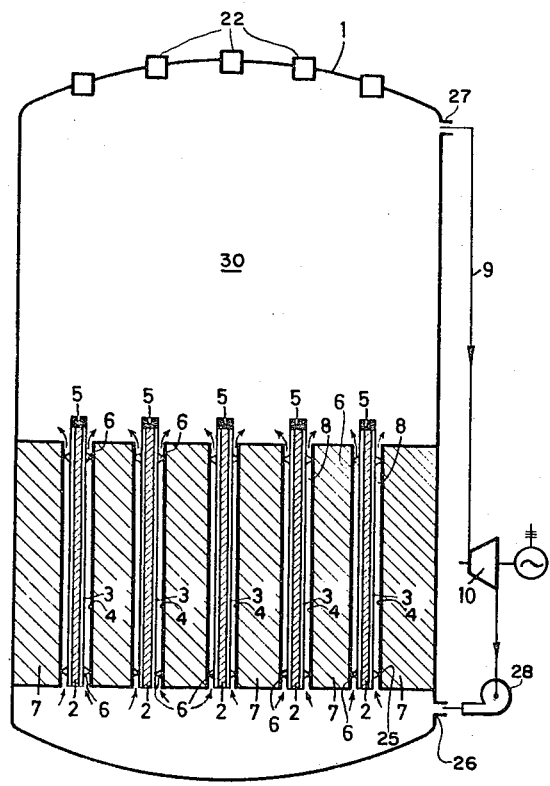
FIGURE 1 is a schematic view of the reactor in vertical section.

Referring now to FIG. 1, the high-melting temperature nuclear fuel elements 2 are disposed within inner tubular members or tubes 3 without contacting the heat-absorbing cooling surface of inner tubes 3. The inner tubes 3 represent the fuel-receiving tubes per se, are provided at their upper ends with plugs 5, and are concentrically disposed within the outer tubular members or tubes 4 by means of flanges 6 so as to be exchangeable. Coolant channels or ducts 25 extend through the moderator region 7 in a lattice-type pattern. Graphite is used as a moderator and reflector. Annular passages or spaces 8 of the cooling ducts 25 are in series with the coolant circuit 9, as indicated by the arrows showing the direction of coolant flow, and the prime mover 10 which is also in the said coolant circuit 9. $CO_2$ or liquid metal (Na) is used as a coolant, with the former being preferred.

In this example of the invention the moderator region 7 is located within the lower portion of a reactor vessel or container 1. At the lower and upper portions of the vessel 1 are inlet and outlet fluid openings 26 and 27, respectively.

In operation, the fluid, which in this example is a gas, enters the inlet opening 26 and flows through the annular passages 8. The heated gas then flows through the outlet opening 27 to the prime mover 10. The heated gas then flows through the turbine portion of the prime mover 10 causing the rotor within the turbine portion to rotate and simultaneously loses pressure and temperature. The rotor, in turn, causes the generator portion of the prime mover to rotate. The outlet gases from the prime mover 10 then flow through a circulating means or compressor 28, where the gases are reccompressed and then circulated through the reactor 30 and the coolant circuit 9.

Figure 2:
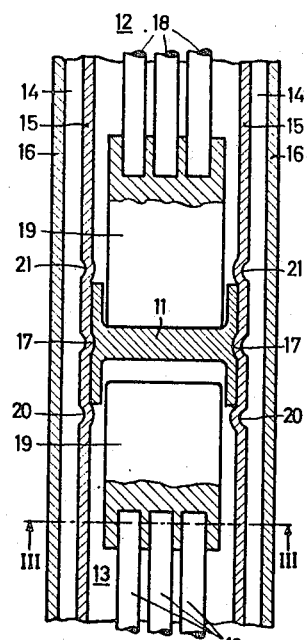
FIG. 2 is a partial view showing a section of a double-walled cooling duct of the reactor together with fuel elements disposed therein.
Figure 3:
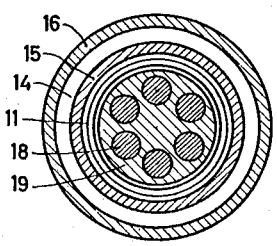
FIG. 3 shows a cross section along the line III—III of FIG. 2.

The contact-free mounting of the fuel elements as well as their construction is shown in greater detail in FIGS. 2 and 3. FIG. 2 shows two fuel groups 12 and 13 disposed, respectively, above and below a supporting means or holder 11, said fuel groups to be described hereinafter. A plurality of fuel groups are arranged in this manner at several levels within the cooling ducts 25 (FIG. 1). Each duct 25 comprises concentric steel or zirconium tubular members or tubes 15 and 16 forming an annular passage or space 14 therebetween, with the inner tube 15 being adapted to receive the fuel. The absorption coefficient of the tubes for thermal radiation can be increased up to about 0.6 through suitable surface treatment. Tubes of stainless steel are suitable up to a coolant temperature of 700° C. when used in connection with $CO_2$ cooling, and up to 600° C. for sodium cooling. For zirconium tubes, the corresponding temperatures are 650° and 500° C.

Between the upper and lower ends of two adjacent fuel groups, to be described hereinafter, within the inner cooling tube 15, there is provided the aforementioned holder 11 which consists of steel or zirconium and has a groove 17. During the assembly, the means for mounting the fuel groups comprises the holder 11 which is inserted into the inner steel or zirconium tube 15, and which is fixed in place therein by subsequently deforming the tube so as to provide an annular indentation engaging the groove 17 and to provide portions, such as at 20 and 21, engaging the upper and lower edges of said holder. The positions and spacing of the holders can be checked best by gamma or X-radiation. The spacing between one holder and the other is determined by the length of the fuel elements, which amounts to about 20 to 50 cm., and also by the required elongation clearance in the axial direction. Fuel groups and holders alternate in the manner shown. In order to ensure a uniform heat distribution and to save material, the holders 11 preferably are recessed or grate-shaped between adjacent elements.

The fuel groups include fuel elements or rods 18 (diameter about 1 cm.) and the graphite blocks 19 into which extend the ends of said rods. The fuel groups 12 and 13 are loosely supported by the recessed members or holders 11 which, by virtue of their cylindrical flanges, also function as spacers in a radial direction to prevent said elements from contacting the inner walls of the inner tubes 15.

The inner tubes 15 containing the fuel elements are provided with gas-tight sealing means at their upper and lower ends in the form of the aforementioned plugs 5 (see FIG. 1), through which plugs the tubes can be either evacuated or filled with an inert, heat transfer gas. With a filling of pressurized gas there may be obtained a pressure equilibrium with the coolant which permits the use of inner tubes having relatively thin walls. In this case, the heat conduction in the gas assists the heat transfer by radiation. As shown in FIG. 1, the upper ends of the inner tubes extend outward from the moderator zone.

The outer tubes and the components of the moderator region are rigidly connected together to form a frame. In the present case, a renewal of reactor fuel is effected by replacing fuel element assemblies as a whole. For this purpose, the upper part of the reactor vessel is provided with normally plugged apertures 22 (FIG. 1) each of which permit the passage of an inner tube 15.

In the embodiment shown in FIG. 3, the fuel rods 18 are inserted into the graphite holding blocks 19 in a circular pattern. This arrangement, however, can be replaced by a single cylindrical hollow rod (not shown) which can be slotted or split in order to provide for a better heat flow. Likewise, fuel plates can be used instead of rods, which plates can be arranged in a square or in parallel relationship leaving slots. In particular, there can be used plates of nuclear fuel, breeder material and graphite (as moderator plates) alternately arranged side by side. In this case, the cooling ducts 25 preferably should have a quadratic or rectangular cross section to conform to the cross section of the plates.

Fuel elements according to the invention have the advantage that no reactions of solids between the jacket and the fuel will take place, that, furthermore, the fuel cannot mechanically stress the other components of the assemblies and the cooling ducts, and that thereby the fuel itself does not impose any restriction upon the operating temperature of the coolant.

It is to be understood that numerous modifications of the exemplary reactor system disclosed can be made by those skilled in the art without departing from the spirit and scope of the invention.

Accordingly, what is claimed as inventive is:

1. A fuel element assembly for a neutronic reactor, said assembly comprising an elongated tubular member, a plurality of elongated fuel elements disposed within and out of contact with said tubular member and extending longitudinally thereof, means disposed within said tubular member for supporting said fuel elements in a substantially parallel array in spaced relation relative to the inner wall of said tubular member and in at least transversely spaced relation relative to one another, said supporting means including at least two blocks of moderator material spaced along the length of said tubular member and contained therein, said fuel elements being suspended between said blocks, means for movably mounting at least one of said blocks relative to said tubular member so that said fuel elements can elongate differentially relative to said tubular member, said mounting means including a recessed member rigidly secured to said tubular member adjacent said one block, said one block being slidably mounted in the recess of said recessed member, and means for sealing said fuel elements in said tubular member.

2. A fuel element assembly for a neutronic reactor, said assembly comprising an elongated tubular member, a plurality of elongated fuel elements disposed within said tubular member and extending longitudinally thereof, means disposed within said tubular member for supporting said fuel elements in a plurality of groups spaced tandemly along the length of said tubular member, the fuel elements of each said groups being spaced inwardly and out of contact from the wall of said tubular member and transversely from one another, said supporting means including a plurality of pairs of mounting blocks spaced along the length of said tubular member, said groups of fuel elements being suspended adjacent their ends from said pairs of blocks respectively, and a transversely extending supporting member inserted between each pair of said blocks and rigidly secured to the wall of said tubular member, each of said supporting members having a pair of relatively short tubular elements joined to opposite surfaces thereof, the adjacent ones of said blocks being slidably mounted and relatively closely fitted in said tubular elements respectively.

References Cited by the Examiner

UNITED STATES PATENTS

| | | | |
|---|---|---|---|
| 2,708,656 | 5/55 | Fermi et al. | 204—193.2 |
| 2,848,404 | 8/58 | Treshow | 204—193.2 |
| 2,865,826 | 12/58 | Stewart | 204—193.2 |
| 2,890,158 | 6/59 | Ohlinger et al. | 204—193.2 |
| 2,905,611 | 9/59 | Tonks | 204—193.2 |
| 2,975,114 | 3/61 | Allison | 204—193.2 |
| 2,977,297 | 3/61 | Evans et al. | 204—193.2 |
| 2,999,059 | 9/61 | Treshow | 204—193.2 |
| 3,000,728 | 9/61 | Long et al. | 204—193.2 |
| 3,028,330 | 4/62 | Justheim | 204—193.2 |
| 3,053,743 | 9/62 | Cain | 204—154.2 |

FOREIGN PATENTS

| | | |
|---|---|---|
| 1,156,132 | 12/57 | France. |
| 779,408 | 7/57 | Great Britain. |
| 791,011 | 2/58 | Great Britain. |
| 794,901 | 5/58 | Great Britain. |
| 157,657 | 1/57 | Switzerland. |

REUBEN EPSTEIN, *Acting Primary Examiner.*

LEON D. ROSDOL, ROGER L. CAMPBELL, CARL D. QUARFORTH, *Examiners.*